United States Patent [19]

Hayashi et al.

[11] Patent Number: 4,553,212
[45] Date of Patent: Nov. 12, 1985

[54] LEAKAGE INSPECTION DEVICE FOR BRAKE HOSES

[75] Inventors: Chikahisa Hayashi, Anzyou; Masakatsu Kanayama, Inazawa, both of Japan

[73] Assignee: Toyoda Gosei Co., Ltd., Nishikasugai, Japan

[21] Appl. No.: 483,754

[22] Filed: Apr. 11, 1983

[30] Foreign Application Priority Data

Apr. 14, 1982 [JP] Japan .................................. 57-61977

[51] Int. Cl.⁴ .............................................. G01M 3/26
[52] U.S. Cl. .................................... 364/507; 364/509; 340/52 C; 73/40.5 R; 73/49.1
[58] Field of Search ............... 364/507, 509, 510, 551; 340/52 R, 52 A, 52 B, 52 C, 605; 73/40.5 R, 49.1, 121, 40, 49.5

[56] References Cited

U.S. PATENT DOCUMENTS

| | | | |
|---|---|---|---|
| 3,772,672 | 11/1973 | Adahan | 340/52 C X |
| 4,091,658 | 5/1978 | Covington et al. | 73/40.5 R |
| 4,170,130 | 10/1979 | Borror et al. | 73/49.1 |
| 4,269,061 | 5/1981 | Hatsuno et al. | 73/40 |
| 4,416,146 | 11/1983 | Ambrose | 73/49.5 |

Primary Examiner—Gary Chin
Attorney, Agent, or Firm—Cushman, Darby & Cushman

[57] ABSTRACT

A leakage detecting device for brake hoses is composed of a first cylinder chamber communicated with a brake hose to be inspected, a second cylinder chamber connected to a fluid pressure source, a leakage detecting cylinder with a piston disposed between the first and second cylinder chambers, displacement amount detecting means for detecting displacement of the piston of the leakage detecting cylinder and generating a signal corresponding to the displacement amount, and processing means for receiving the displacement detecting signal from the displacement amount detecting means, calculating leakage amount per unit time for a prescribed time based on the received signal, comparing data of the leakage amount per unit time with the upper limit value for leakage of a good product which is set by a setting device, and generating a failed product detected signal when the leakage amount exceeds the upper limit value for leakage of a good product.

4 Claims, 4 Drawing Figures

LEAKAGE INSPECTION DEVICE FOR BRAKE HOSES

BACKGROUND OF THE INVENTION

This invention relates to a leakage inspection device for brake hoses, which is used for pressure endurance testing of brake hoses at the manufacturing site, and more specifically to an inspection device wherein both ends of a brake hose are closed and fluid pressure is applied to the interior of the brake hose, the time variation of the internal pressure is detected, thereby the leakage amount of the brake hose is determined.

When brake hoses for automobiles are manufactured, pressure endurance test of all products is usually performed for three minutes. The pressure endurance test is accompanied by leakage inspection which is conventionally carried out by visual inspection of appearance or hand-touching checking of fluid leakage when a prescribed fluid pressure is applied to the interior of the brake hose. Although complete leakage of a brake hose may be easily found by the above-mentioned manner, partial inner leakage of a brake hose composed of an outer cover, an upper knitted portion, an intermediate rubber portion, a lower knitted portion and an inner tube frequently remains undetected since the hose may be hardened or the outer appearance does not show such inner leakage.

SUMMARY OF THE INVENTION

An object of this invention is to provide a leakage inspection device for brake hoses wherein a slight leakage within a brake hose can be detected accurately.

Another object of this invention is to provide a leakage inspection device for brake hoses wherein the determination of a brake hose as good or failed product can be carried out at high precision and high efficiency.

In order to attain the objects, a leakage inspection device for brake hoses according to this invention is composed of a first cylinder chamber communicated with a brake hose to be inspected; a second cylinder chamber connected to a fluid pressure source; a leakage detecting cylinder with a piston disposed between the first and second cylinder chamber; displacement amount detecting means for detecting displacement of the piston of the leakage detecting cylinder and generating a signal corresponding to the displacement amount; and processing means for receiving the displacement detecting signal from the displacement amount detecting means, calculating the leakage amount per unit time for a prescribed time based on the received signal, comparing data of the leakage amount per unit time with the upper limit value for leakage of a good product, and generating a signal indicating a failed product when the leakage amount exceeds the upper limit value for leakage of a good product.

DESCRIPTION OF THE PREFERRED EMBODIMENT

An embodiment of the present invention will now be described referring to the accompanying drawings.

Figure 1:
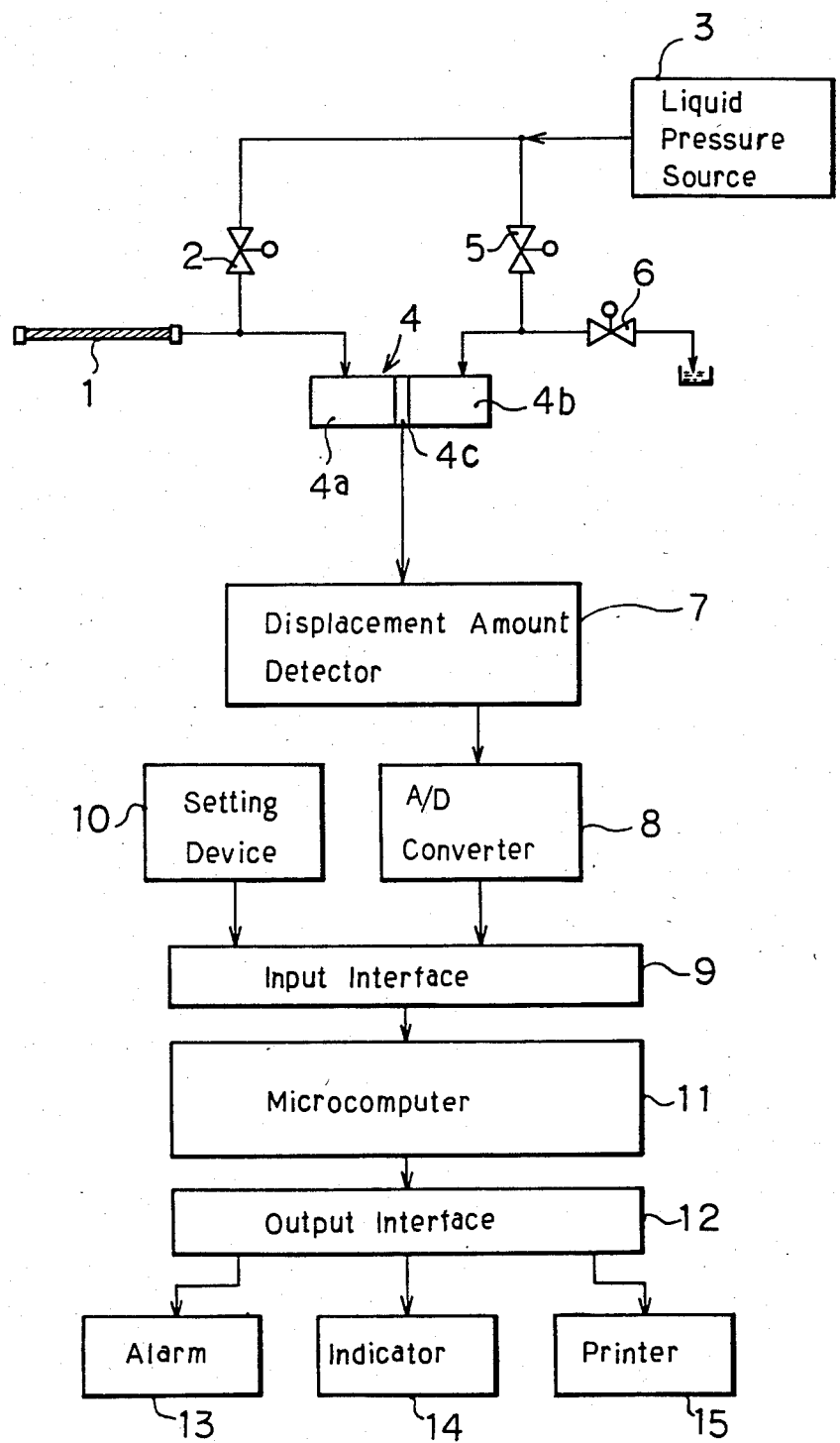
FIG. 1 is a block diagramm of a leakage inspection device as an embodiment of the invention.
Figure 2:
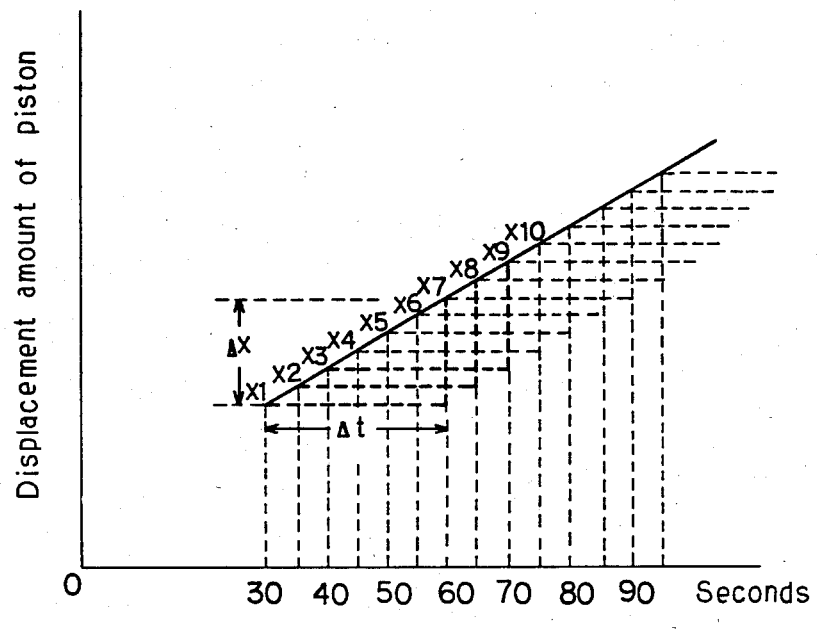
FIG. 2 is a graph illustrating piston displacement amount versus time.

FIG. 1 shows a block diagram of a leakage inspection device. In the figure a brake hose 1 to be inspected has one end closed and other end connected to a pipeline for supplying liquid pressure. The pipeline is connected to a liquid pressure source 3 through a valve 2 and also to a first cylinder chamber 4a of a leakage detecting cylinder 4. The leakage detecting cylinder comprises a first cylinder chamber 4a and a second cylinder chamber 4b, and a piston 4c which is interposed between the first cylinder chamber 4a and the second cylinder chamber 4b. The piston 4c receives pressure from both sides and is displaced according to the pressure difference. A valve 5 is inserted in a pipeline connected from the liquid pressure source 3 to the second cylinder chamber 4b, while a valve 6 is inserted in a drain pipe connected to the second cylinder chamber 4b. A displacement detector 7 for detecting displacement of the piston 4c and generating an analog signal corresponding to the displacement is composed of a potentiometer of the like. An A/D converter 8 converts the analog signal generated from the displacement detector 7 into a digital signal, and the output of the A/D converter 8 is transmitted through an input interface 9 to a microcomputer 11 as processing unit. A setting device 10 for setting an upper limit value for leakage of a good brake hose is composed of a digital switch or the like. The setting device 10 sets an upper limit value for leakage amount of a good article per a prescribed time (cc/min) based on testing, and the upper limit value is entered through the input interface 9 to the microcomputer 11. The microcomputer 11 receives the detecting signal from the displacement amount detector and calculates the leakage amount per unit time from the displacement detecting signal according to a prescribed program and prescribed time interval. The leakage amount data in each prescribed time interval is compared with the upper limit value of leakage of a good product which is set by the setting device, and if the leakage amount data becomes beyond the upper limit value of leakage the defect detecting signal is generated. In the practice of the leakage detecting action, for example, data of the displacement amount is taken every five seconds for 30 seconds from the beginning of inspection, and after that time the leakage amount for the past 30 seconds is calculated during each five seconds according to the following equation:

$$60S \cdot \Delta X / \Delta t = Q \text{ cc/min}$$

wherein S = cross-section of inner diameter of cylinder, $\Delta X$ = displacement amount of the piston 4c for $\Delta t = 30$ seconds as shown in FIG. 2.

Furthermore, the program is constituted so that if a leakage of a large amount occurs and data of the displacement amount of the piston 4c from the displacement detector 7 attains the limit value of detection, the failure article detecting signal is immediately generated even during the waiting time of 30 seconds before calculating the leakage amount. An alarm 13 indicating the occurence of a defective product receives the defective product detecting signal from the microcomputer 11 through the output interface 12 and operates a buzzer, a lamp or the like so as to inform a worker of the occurence of defective product. An indicator 14 such as a CRT or LED displays the leakage amount for each setting time based on the leakage data transmitted from the microcomputer 11. A printer 15 prints the leakage data onto a recording paper. Furthermore, data may be recorded by connecting memory means such as a magnetic disc, a magnetic tape or a punched paper tape.

Operation of the leakage inspection device for a brake hose will now be explained.

First, valves 2 and 6 are opened, and fluid such as water enters in a brake hose 1 and a first cylinder chamber 4a of a leakage detecting cylinder 4 through a pipeline and then pressure of 300 Kg/cm for example is applied to the first cylinder chamber 4a. Valve 5 is opened and valves 2 and 6 are closed and then similar pressure is applied to a second cylinder chamber 4b. The leakage inspection starts at this stage, and if leakage exists in the brake hose 1 pressure in the first cylinder chamber 4a decreases and therefore piston 4c is gradually displaced to the left. Since the brake hose 1 itself is slightly expanded according to the internal pressure, displacement of the piston 4c may be detected even if leakage is not at all present at the start of the inspection. Displacement amount of the piston 4c in such condition is detected by a displacement amount detector 7 and converted into digital displacement amount detecting signal through an A/D converter 8, and the digital signal is transmitted to the microcomputer 11. In the microcomputer 11, data of the displacement amount is taken in every five seconds for example and stored during the inspection, but the leakage amount is not calculated for thirty seconds, for example, after starting the inspection. If the displacement amount of the piston 4c attains the limit value of the displacement amount detector 7 during the initial waiting time of thirty seconds, it is determined that leakage of a large amount has occured in the brake hose 1 and therefore the failed product detecting signal is immediately generated from the microcomputer 11 and an alarm 13 sounds to stop the inspection.

In the usual inspection for pressure endurance, after thirty seconds from the beginning of inspection the leakage amount $Q = 60S \cdot \Delta X/\Delta t$ is calculated from data of the piston displacement amount taken every five seconds from the beginning of inspection and stored in the microcomputer 11 and also from new data of the displacement amount taken after 30 seconds. Referring to FIG. 2, for example, after 60 seconds from the beginning of inspection, $\Delta t$ becomes 30 seconds and $\Delta X$ becomes (X7−X1) thereby $Q(cc/min) = 2S(X7 - X1)$ can be calculated.

After the leakage amount for 30 seconds is calculated every five seconds in the microcomputer, data of the leakage amount is transmitted from the microcomputer 11 to an indicator 14 and a printer 15 and each value is displayed in sequence. At the same time, data of the leakage amount is compared in the microcomputer 11 with the upper limit value for leakage of a good product (being substantially equal to the value caused by expansion of the brake hose) previously set by the setting device 10 in each sampling time. If the leakage amount exceeds the upper limit value of leakage of a good product (varying dependent on each time), a detecting signal of failed product is generated. The detecting signal is transmitted to an alarm 13 and an alarm signal for the failed product detection is generated and the failed product display is indicated at the end of inspection.

In addition, the data reading time during each five seconds and the sampling time for 30 seconds as specified in the above-mentioned embodiment may be as desired so that, for example, the sampling is effected for 10 seconds at intervals of one second.

Figure 3:
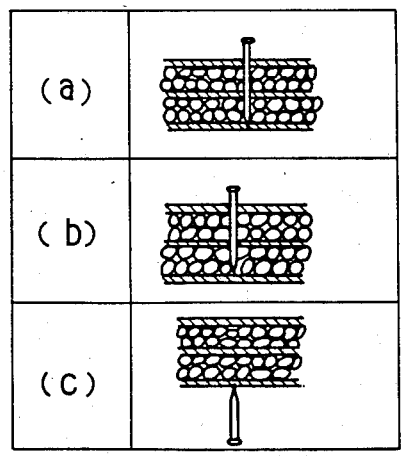
FIG. 3 shows cross-sectional views of three specimens of a brake hose.
Figure 4:
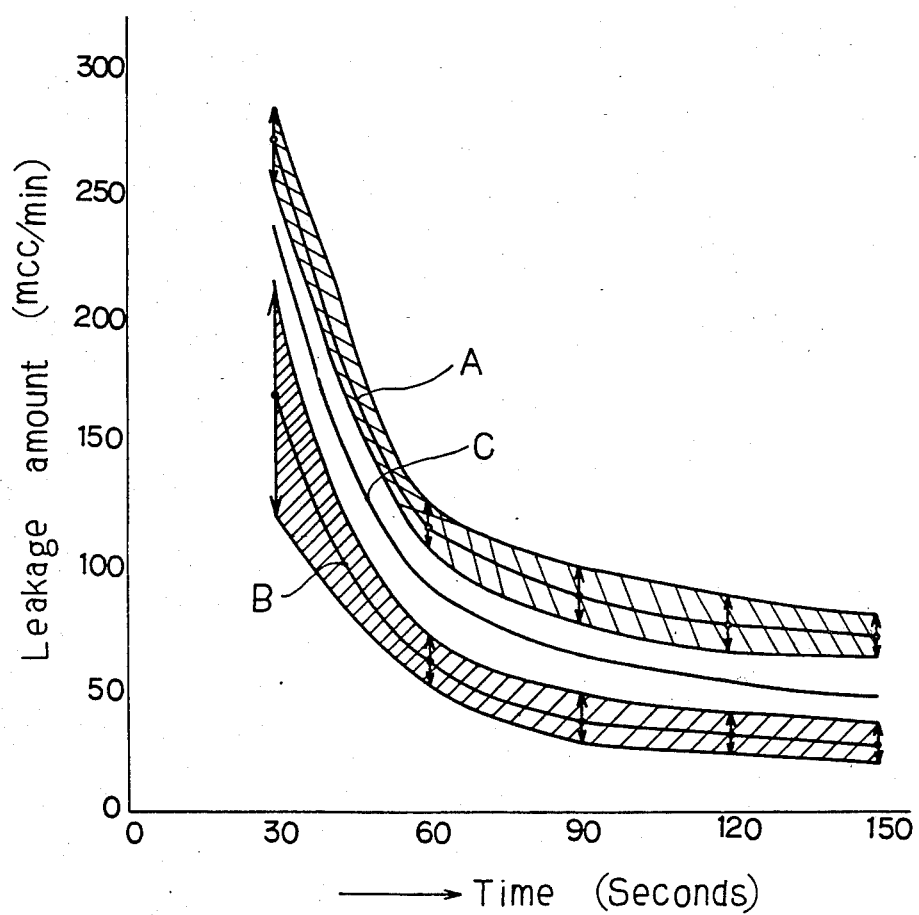
FIG. 4 is a graph illustrating leakage amount versus time.

FIGS. 3 and 4 illustrate the results of an experiment using a leakage inspection device having the above-mentioned construction. Three different samples a,b,c of failed brake hoses as shown in FIG. 3 were used. Sample a shows a hose with a pin stuck completely through to the interior, sample b shows a hose with a pin stuck from the outer cover to a position just before the inner tube, and sample c shows a hose with a pin stuck from the interior to the inner tube only. These failed samples and a good brake hose were subjected to pressure endurance inspection of 300 Kg/Cm accompanied by leakage inspection.

Test results were as follows. In the brake hose of sample a, leakage of the outer cover by allowing water to penetrate was found by visual inspection. The displacement amount was measured using an inspection device which went beyond the measuring limit of the displacement amount detecting device 7, and the sample a was determined to be a failed product during the inspection. In the brake hose of sample b, no difference from a good product was found in the visual inspection or hand-touching inspection. But inspection using the inspection device detected the leakage amount as shown in curve A of FIG. 4 as the time passed. Since such detected value exceeds the upper limit value curve C for leakage of a good product, the sample b was determined to be a failed product and an alarm signal was generated. In the brake hose of sample c, internal leakage which hardened the hose was found in the hand-touching inspection, the displacement amount measured using an inspection device went beyond the measuring limit of the displacement amount detecting device 7 in similar manner to the sample a, and the sample c was determined to be a failed product during the inspection.

On the other hand, in a good brake hose without any failure, naturally no abnormal condition was found in the visual inspection. Data of leakage amount obtained by an inspection device became that shown in the B - curve of FIG. 4. In other words, expansion of the brake hose itself was detected as leakage amount. As the experiment of good products and failed products was performed repeatedly, some deviation was seen regarding both good and failed products. As a result, the region of failed products including the A-curve of FIG. 4 and of good products including the B-curve was obtained. The upper limit value curve C for leakage of good products, to be set by the setting device 10, was obtained by plotting intermediate points between both regions.

In the leakage inspection device constituted as above described, determination of defects can be effected even when a brake hose is partly failed and complete leakage has not yet developed. That is, the inspection device can detect a slight internal leakage and designate it as a failed product and thereby secure the high accuracy of inspection.

Although the processing unit includes a microcomputer and data processing is effected using software thereof in the above-mentioned embodiment, the processing unit may comprise electronic circuits using hard logic.

According to the leakage inspection device of the invention in the above-mentioned embodiments, a slight leakage of a brake hose caused by internal leakage can be detected although such defect cannot be determined by conventional visual inspection or hand-touching inspection, and the leakage inspection can be effected in high accuracy and high effeciency in comparison to manual inspection.

What is claimed is:

1. A leakage inspection device for brake hoses, comprising:
   (a) a first cylinder chamber adapted to communicate with a brake hose to be inspected;
   (b) a second cylinder chamber connected to a fluid pressure source;
   (c) a leakage detecting cylinder with a piston disposed between said first and second cylinder chambers;
   (d) displacement amount detecting means for detecting displacement of said piston of said leakage detecting cylinder and generating a signal corresponding to the displacement amount; and
   (e) processing means for receiving the displacement detecting signal from said displacement amount detecting means, calculating leakage amount per unit time for a prescribed time based on the received signal, comparing data of the leakage amount per unit time with an upper limit value based on leakage of good products, and generating a failed product signal when said leakage amount exceeds said upper limit value.

2. A leakage inspection device for brake hoses, as set forth in claim 1, characterized in that said processing means is provided with a processing function which generates the failed product signal immediately when the displacement detecting data from the displacement amount detecting means attains its limit value of detection.

3. A leakage inspection device for brake hoses, as set forth in claim 1, further comprising a setting device for setting the upper limit value for leakage of a good product and transmitting the set data to the processing means.

4. A leakage inspection device for brake hoses, as set forth in claim 1, further comprising an indicator for indicating the leakage amount calculated by said processing means, and a printer for printing the leakage amount on a recording paper.

* * * * *